(12) United States Patent
Gaviria et al.

(10) Patent No.: US 9,426,643 B2
(45) Date of Patent: *Aug. 23, 2016

(54) USER AUTHORIZATION OF IMPLICIT REGISTRATION OF MULTIPLE IDENTITIES

(71) Applicant: Verizon Patent and Licensing Inc., Basking Ridge, NJ (US)

(72) Inventors: Rafael A. Gaviria, Medford, MA (US);
Elliot G. Eichen, Arlington, MA (US);
Rezwanul Azim, Arlington, MA (US);
James J. Ni, Westford, MA (US);
Gowtham Javaregowda, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 517 days.

This patent is subject to a terminal disclaimer.

(21) Appl. No.: 13/943,214

(22) Filed: Jul. 16, 2013

(65) Prior Publication Data
US 2014/0177481 A1 Jun. 26, 2014

Related U.S. Application Data

(63) Continuation-in-part of application No. 13/722,478, filed on Dec. 20, 2012, now Pat. No. 9,088,865.

(51) Int. Cl.
*H04M 11/10* (2006.01)
*H04W 8/18* (2009.01)
*H04L 29/06* (2006.01)
*H04L 29/08* (2006.01)

(52) U.S. Cl.
CPC ............ *H04W 8/18* (2013.01); *H04L 65/1016* (2013.01); *H04L 65/1073* (2013.01); *H04L 67/30* (2013.01)

(58) Field of Classification Search
USPC ................................. 455/414.1, 433
See application file for complete search history.

(56) References Cited

U.S. PATENT DOCUMENTS

2005/0176421 A1* 8/2005 Matenge ............... H04W 84/14 455/426.1
2012/0243471 A1* 9/2012 Boulos ............... H04W 76/026 370/328

* cited by examiner

*Primary Examiner* — Kwasi Karikari
*Assistant Examiner* — Randy Peaches

(57) ABSTRACT

A network device receives a personal Mobile Directory Number (MDN) associated with an individual subscriber, wherein the individual subscriber is further associated with one or more subscriber devices. The network device receives an additional MDN assigned to the individual subscriber, and sends a notification, requesting the individual subscriber's acceptance of the additional MDN assigned to the individual subscriber, to at least one of the one or more subscriber devices. The network device receives, from one of the one or more subscriber devices, an acceptance of the additional MDN from the individual subscriber. The network device links the additional MDN, the personal MDN, and the one or more subscriber devices, within an Implicit Registration Set (IRS) at a Home Subscriber Server (HSS) in an Internet Protocol Multimedia Subsystem (IMS) network for routing calls to the individual subscriber's additional MDN or personal MDN at the one or more subscriber devices.

22 Claims, 16 Drawing Sheets

US 9,426,643 B2

USER AUTHORIZATION OF IMPLICIT REGISTRATION OF MULTIPLE IDENTITIES

RELATED APPLICATION

The present application is a continuation-in-part (CIP) of U.S. application Ser. No. 13/722,478, entitled "Implicit Registration for Multiple Identities" and filed Dec. 20, 2012, the disclosure of which is incorporated by reference herein in its entirety.

BACKGROUND

The Internet Protocol (IP) multimedia subsystem (IMS), defined by the $3^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. SIP is an application layer control (signaling) protocol for creating, modifying and terminating sessions with one or more participants.

DETAILED DESCRIPTION OF THE PREFERRED EMBODIMENTS

Figure 1A:
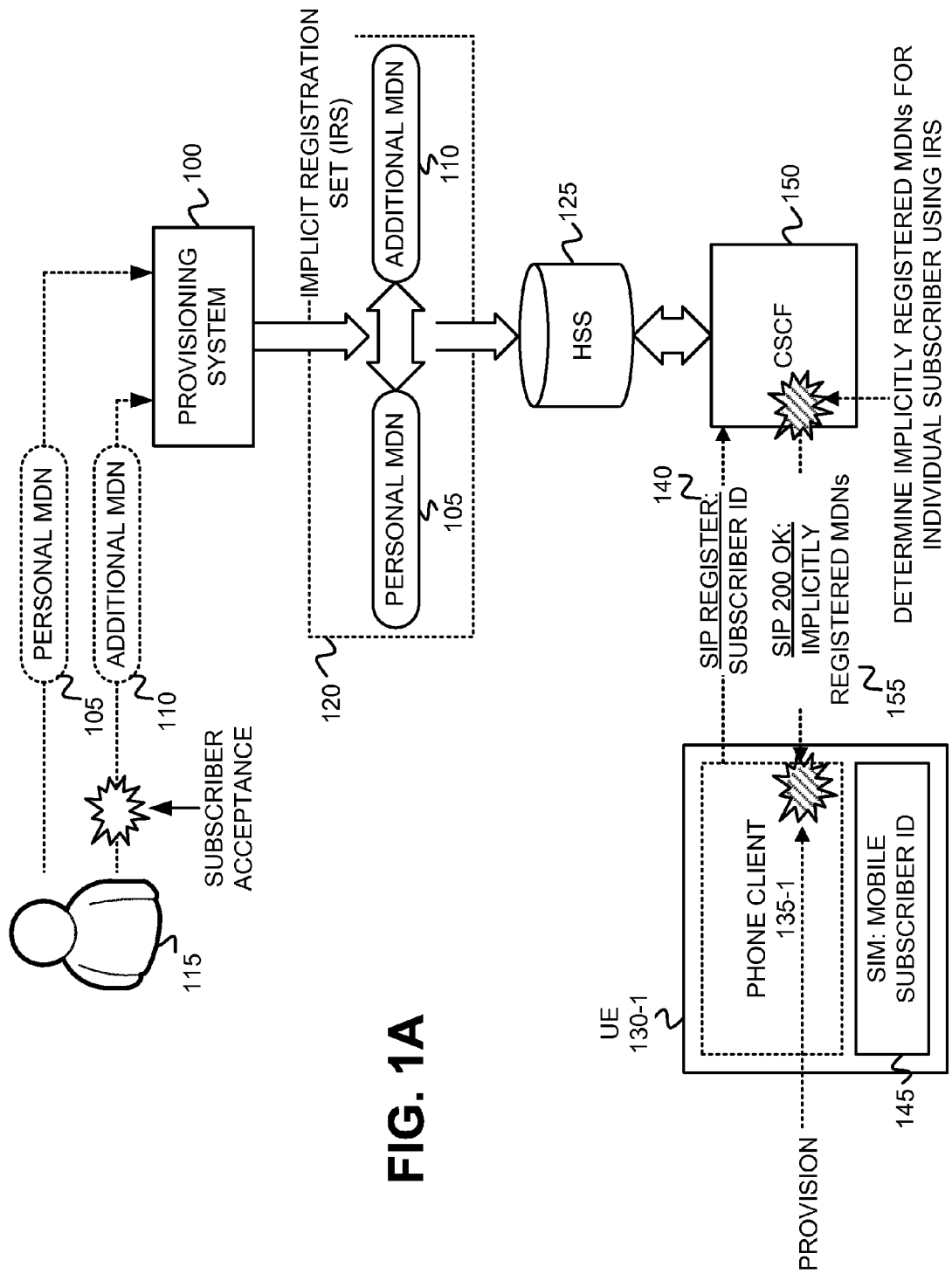
FIGS. 1A and 1B illustrate an overview of the implicit registration of multiple Mobile Directory Numbers associated with a subscriber in an Implicit Registration Set of a Home Subscriber Server in an IMS network.

The following detailed description refers to the accompanying drawings. The same reference numbers in different drawings may identify the same or similar elements. The following detailed description does not limit the invention.

Using multiple calling identities, where a single subscriber is associated with multiple different Mobile Directory Numbers (MDNs), has become common in modern mobile telephony. For example, a single subscriber has a personal phone account with a first MDN, and a work phone account with a second MDN. One existing implementation of dual identities uses two different Subscriber Identity Modules (SIMs) in the subscriber's mobile device, with one SIM storing the personal MDN, and the other SIM storing the work MDN. Another existing implementation of dual identities uses a single SIM that is "burned" with both the personal MDN and the work MDN. These existing techniques for implementing multiple calling identities require the mobile device's one or more SIMs to be "burned" with the multiple different MDNs that are associated with the single subscriber, thus, requiring the SIMs to be switched out, or "re-burned" to add/change calling identities.

Exemplary embodiments described herein use an implicit registration in IMS to link multiple different MDNs for a single subscriber having a single SIM "burned" with a single mobile subscriber identity (IMSI). IMS messaging may be used to link the multiple different MDNs for the single subscriber in an Implicit Registration Set stored in a Home Subscriber Server of the IMS network. Via the linking of the multiple MDNs in the Implicit Registration Set, a call to any one of the linked multiple MDNs can be routed to the mobile device associated with the single subscriber by consulting the Implicit Registration Set. Implicit registration, as described herein, therefore, does not require any alteration of the devices or devices' SIMs. At the subscriber's mobile device, the device auto-provisions a different calling identity, address book, and voicemail box for each of the multiple, implicitly registered MDNs such that the subscriber can conduct calls from the mobile device by selecting any one of the multiple MDNs.

A "personal MDN," as described herein, refers to a MDN assigned to a personal telephone account of an individual subscriber. A personal MDN may include, for example, the individual subscriber's personal telephone phone number. The personal MDN, therefore, is associated with the individual subscriber's personal telephone account that is maintained and paid for by the individual subscriber. A "corporate MDN," as described herein, refers to a MDN assigned to a work or business account of an individual subscriber. A corporate MDN may include, for example, the individual subscriber's work or business telephone number. The corporate MDN, therefore, is associated with the individual subscriber's corporate telephone account that is maintained and paid for by the business that he/she owns or that employs him/her.

Figure 1B:
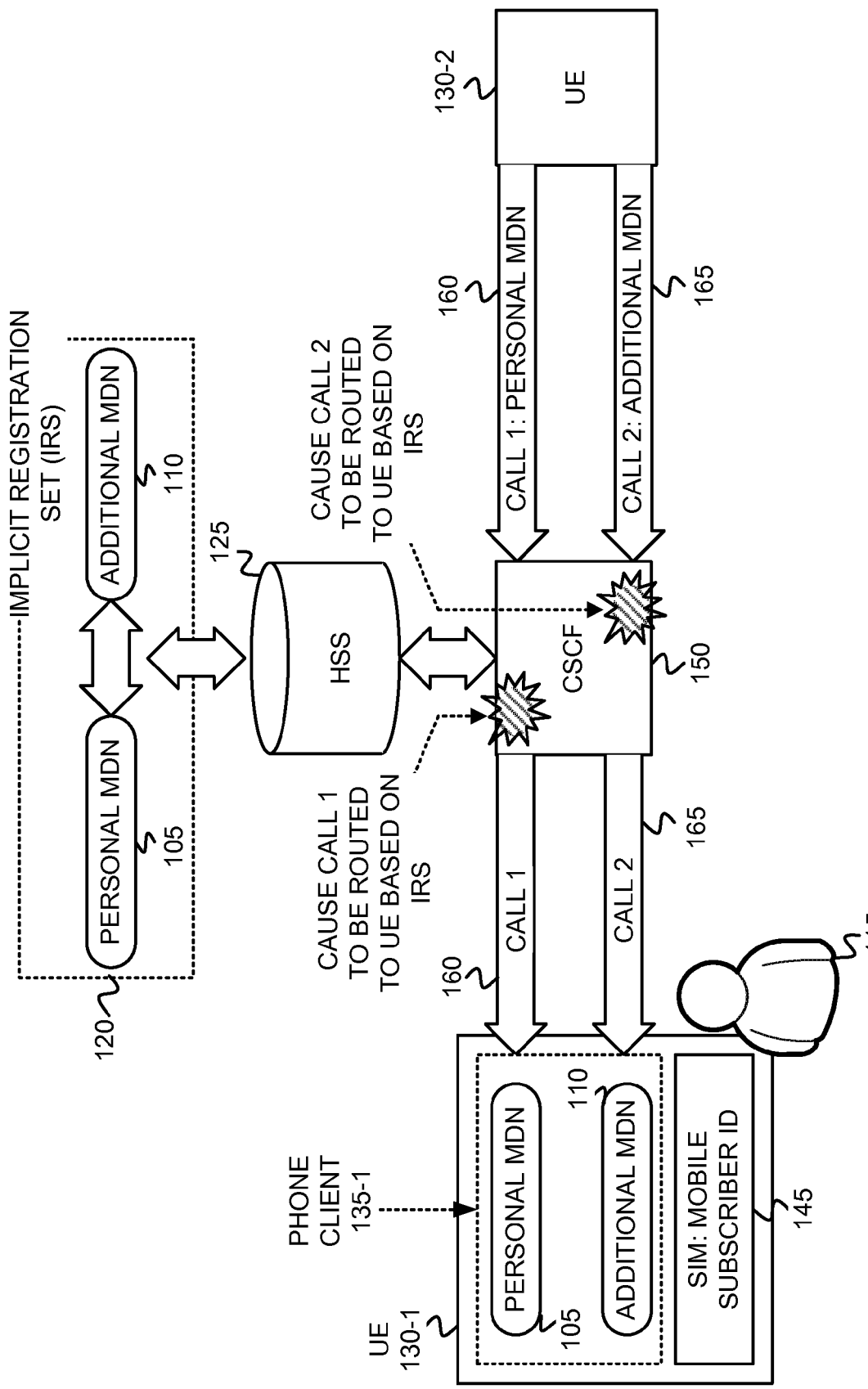

FIGS. 1A and 1B illustrate an overview of the implicit registration of multiple MDNs associated with a subscriber in an Implicit Registration Set (IRS) of a Home Subscriber Server (HSS) in an IMS network. As shown in FIG. 1A, a provisioning system 100 receives a personal Mobile Directory Number (MDN) 105 and an additional MDN 110 that are both associated with a individual subscriber 115. Personal MDN 105 may include a first phone number that is assigned to, or other otherwise corresponds to, a telephone associated with subscriber 115 (e.g., a user equipment). Additional MDN 110 may include a second phone number associated with subscriber 115. In one embodiment, additional MDN 110 may include a telephone number assigned to subscriber 115 as subscriber 115's business number (i.e., the number at which subscriber 115 conducts calls for purposes of business). Additional MDN 110 may include a telephone number assigned to subscriber 115 as an employee work number (i.e., a corporate MDN).

Provisioning system 100 may request an acceptance of additional MDN 110 from subscriber 115, as described below, prior to the additional MDN being linked to subscriber 115 and personal MDN 105. Upon receipt of an acceptance of the additional MDN 110 from subscriber 115, provisioning system 100 may link, within an Implicit Registration Set (IRS) 120 within a Home Subscriber Server (HSS) 125, personal MDN 105 with additional MDN 110. The linkage of personal MDN 105 and additional MDN 110 may further link with one or more User Equipment (UE) devices associated with subscriber 115. Each of the one or more UE devices associated with subscriber 115 may have a subscriber ID (e.g., a mobile subscriber ID) that may, for example, be stored within a Subscriber Identity Module (SIM) contained within each of the one or more UE devices. HSS 125 may reside in an IMS network.

Subsequent to linkage of personal MDN 105 and additional MDN 110 in IRS 120, a UE 130-1 associated with subscriber 115 may send an SIP REGISTER message 140, which includes subscriber ID information (e.g., personal MDN 105 or additional MDN 110) stored in a SIM 145 at UE 130-1, to a Call Session Control Function (CSCF) 150 in an IMS. CSCF 150 performs a look-up into IRS 120 to determine implicitly registered MDNs for subscriber 115 associated with UE 130-1. The implicitly registered MDNs include personal MDN 105 and additional MDN 110 linked with one another, and with the subscriber ID stored in SIM 145 of UE 130-1.

CSCF 150 may return a SIP 200 OK message 155 to UE 130-1, where message 155 includes the implicitly registered MDNs (e.g., personal MDN 105 and additional MDN 110) associated with the subscriber ID stored in SIM 145 of UE 130-1. Upon receipt of SIP 200 OK message 155, phone client 135-1 of UE 130-1 provisions a MDN-specific calling ID, an address book, and a voice mailbox for each of the implicitly registered MDNs included in message 155. UE 130-1 may subsequently send and receive calls from/to each of the implicitly registered MDNs included in message 155.

FIG. 1B depicts an overview of UE 130-1 receiving multiple calls to personal MDN 105 and additional MDN 110 that may occur subsequent to the implicit registration of multiple MDNs associated with subscriber 115 in IRS 120 of HSS 125, as described with respect to FIG. 1A. As shown in FIG. 1B, another UE 130-2 may send a first call 160 that is destined for personal MDN 105 associated with subscriber 115. Call 1 160 may include an identification of subscriber 115's personal MDN. Upon receipt of signaling associated with call 1 160, CSCF 150 may consult IRS 120 of HSS 125 to determine the subscriber ID and/or UE ID associated with the personal MDN identified in call 1 160. CSCF 150 may cause call 1 160 to be routed to personal MDN 105 at UE 130-1.

As further shown in FIG. 1B, UE 130-2 (or a different UE not shown) may send a second call 165 that is destined for additional MDN 110 associated with subscriber 115. Call 2 165 may include an identification of subscriber 115's additional MDN (e.g., corporate MDN). Upon receipt of signaling associated with call 2 165, CSCF 150 may consult IRS 120 of HSS 125 to determine the subscriber ID and/or UE ID associated with the additional MDN identified in call 2 165. CSCF 150 may cause call 2 165 to be routed to additional MDN 110 at UE 130-1.

FIGS. 1A and 1B have been described with respect to implicitly registering a personal MDN and an additional MDN in IRS 120. However, in a similar fashion, more than two MDNs may be implicitly registered within IRS 120 (e.g., a personal MDN and two corporate MDNs, a corporate MDN and two personal MDNs, etc.). Additionally, the multiple MDNs linked in IRS 120 may not just be a personal and a corporate MDN. Two or more personal MDNs, two or more corporate MDNs, or two or more other types of MDNs may be implicitly registered in IRS 120 in other embodiments. Any two or more MDNs may be implicitly registered in IRS 120 using the techniques described herein. FIG. 1A has been described as using SIP messages (e.g., SIP register message 140 and SIP 200 OK message 155) for enabling UE 130-1 to obtain the multiple implicitly registered MDNs from IRS 120 at HSS 125. However, protocols other than SIP may be used in the techniques described herein. Such protocols may employ messaging that is different than SIP register message 140 and SIP 200 OK message 155. IRS 120 may also be stored at other nodes or devices within a network, and not just at HSS 125 in an IMS network.

Figure 2:
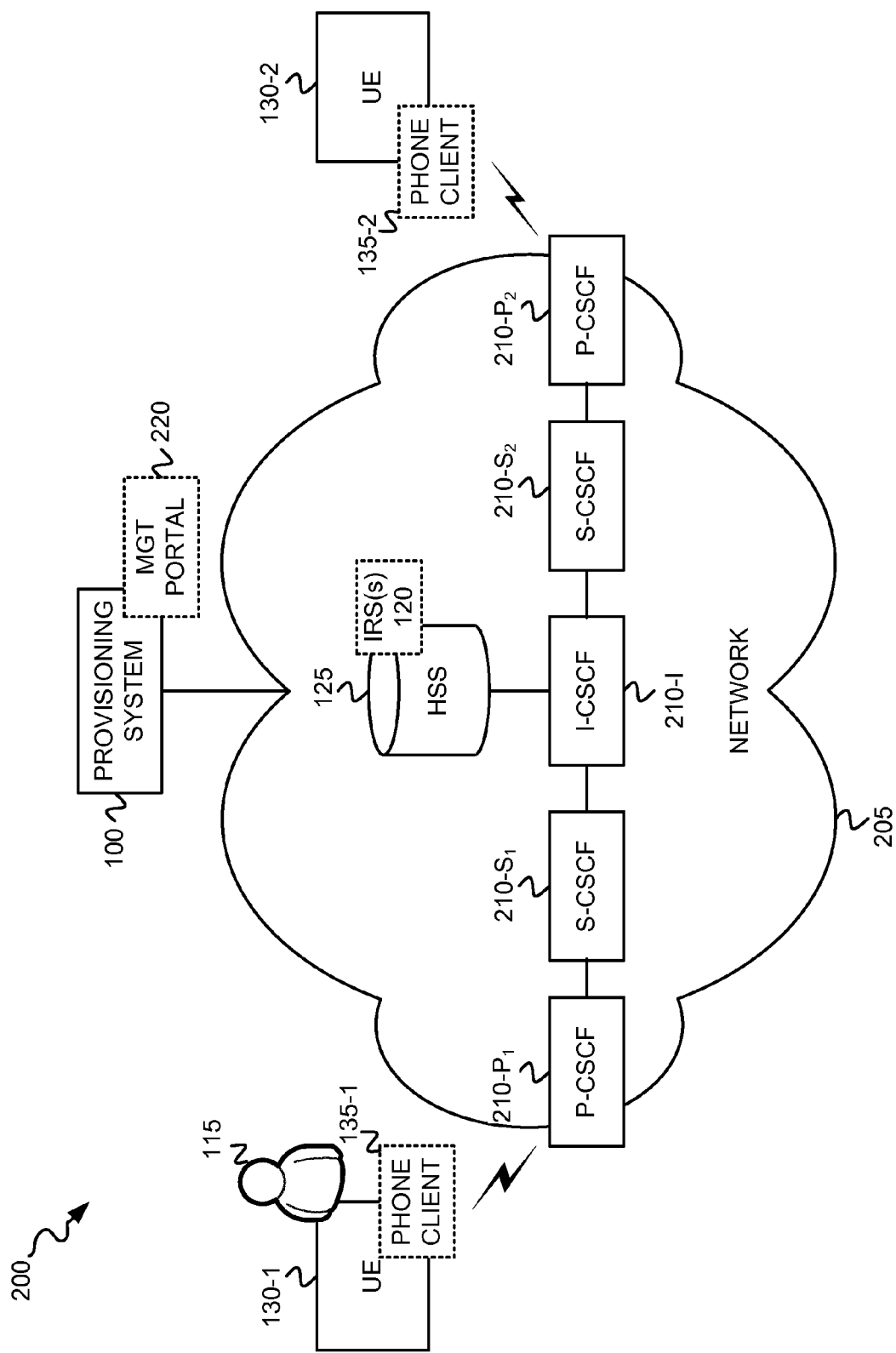
FIG. 2 depicts an exemplary network environment in which multiple Mobile Directory Numbers associated with a subscriber may be implicitly registered in the Implicit Registration Set of the Home Subscriber Network of FIGS. 1A and 1B.

FIG. 2 depicts an exemplary network environment 200 in which multiple MDNs associated with subscriber 115 may be implicitly registered in IRS(s) 120 of HSS 125. As shown, network environment 200 may include UEs 130-1 and 130-2 (generically and individually referred to herein as "UE 130"), and provisioning system 100, connected with a network 205 via wired or wireless links. Network 205 may include one or more networks of any type, including an IMS network. Network 205 may include one or more wired networks, such as, for example, a local area network (LAN), a wide area network (WAN), a metropolitan area network (MAN), a cable network, a Public Switched Telephone Network (PSTN), an intranet, and/or the Internet. Network 205 may further include one or more wireless-based networks, such as, for example, a wireless satellite network and/or a wireless public land mobile network (PLMN). The wireless PLMN may include a Code Division Multiple Access (CDMA) 2000 PLMN, a Global System for Mobile Communications (GSM) PLMN, a Long Term Evolution (LTE) PLMN and/or other types of PLMNs. Network 205 may implement circuit-switched or packet-switched telephony. The packet-switched telephony may include IP based telephony. The IMS network may use SIP for voice and multimedia session control.

Provisioning system 100 may include a network device, or multiple network devices, that links multiple MDNs within IRS 120, and performs other functions as described further herein. As shown in FIG. 2, provisioning system 100 may implement a management portal 220 that enables an operator or administrator to assign MDNs to individual subscribers. In other implementations, management portal 220 may be implemented by devices other than provisioning system 100 (e.g., by a UE, by a server, etc.). UEs 130-1 and 130-2 may each include, for example, a telephone (land-line or mobile), a personal digital assistant (PDA), or a computer (e.g., tablet, desktop, palmtop, or laptop). UEs 130-1 and 130-2 may each execute a respective phone client 135-1 and 135-2 that may send/receive voice and/or video calls to/from network 205 and may send/receive SIP signaling messaging to/from the IMS network of network 205. Phone clients 135-1 and 135-2 (generically and individually referred to herein as "phone client 135") may each maintain separate calling IDs, address books and voice mailboxes for each different MDN implicitly registered for a respective UE 130. For example, phone client 135-1 at UE 130-1 may maintain a calling ID, address book and voice mailbox for a personal MDN, and a different calling ID, address book and voice mailbox for a corporate MDN.

As further shown, network 205 may include a Proxy CSCF (P-CSCF) 210-P$_1$, a serving CSCF (S-CSCF) 210-S$_1$, an Interrogating CSCF (I-CSCF) 210-I, a S-CSCF 210-S$_2$, a P-CSCF 210-P$_2$, and HSS 125. P-CSCF 210-P$_1$, S-CSCF 210-S$_1$, I-CSCF 210-I, S-CSCF 210-S$_2$, and P-CSCF 210-P$_2$ may be generically and individually referred to herein as "CSCF 210".

P-CSCF 210-P$_1$ acts as an edge of the IMS network through which UE 130-1 obtains access. P-CSCF 210-P$_1$ maintains an awareness of all IMS endpoints that are currently registered with the IMS network, and performs various manipulations of SIP signaling messages that are arriving from, or being sent to, the IMS endpoints (e.g, UEs 130-1 and 130-2). P-CSCF 210-P$_1$ maintains a connection with S-CSCF 210-S$_1$.

S-CSCF 210-S$_1$ processes all originating and terminating SIP requests and responses associated with endpoints registered with S-CSCF 210-S$_1$ (including UE 130-1). S-CSCF 210-S$_1$ routes the SIP signaling towards its destination (e.g., towards P-CSCF 210-P$_1$ and UE 130-1), or towards UE 130-1 via I-CSCF 210-I. I-CSCF 210-I passes SIP signaling to/from S-CSCF 210-S$_1$ and S-CSCF 210-S$_2$. I-CSCF 210-I queries HSS 125 to learn the identity of the S-CSCF assigned to a given UE 130 so that it can properly forward the SIP signaling.

S-CSCF 210-S$_2$ processes all originating and terminating SIP requests and responses associated with endpoints registered with S-CSCF 210-S$_2$ (including UE 130-2). S-CSCF 210-S$_2$ routes the SIP signaling towards its destination (e.g., towards P-CSCF 210-P$_2$ and UE 130-2), or towards UE 130-1 via I-CSCF 210-I. P-CSCF 210-P$_2$ acts as an edge of the IMS network through which UE 130-2 obtains access. P-CSCF 210-P$_2$ maintains an awareness of all IMS endpoints that are currently registered with the IMS network, and performs various manipulations of SIP signaling messages that are arriving from, or being sent to, the IMS endpoints (e.g., UEs 130-1 and 130-2). P-CSCF 210-P$_2$ maintains a connection with S-CSCF 210-S$_2$.

P-CSCF 210-P$_1$, S-CSCF 210-S$_1$, I-CSCF 210-I, S-CSCF 210-S$_2$, or P-CSCF 210-P$_2$ may each include functionality implemented in multiple, different network devices, or in a same, single network device. HSS 125 may store IRS(s) 120. As described with respect to FIGS. 1A and 1B, IRS(s) 120 may link multiple MDNs associated with a single subscriber.

The configuration of network components of network environment 200 shown in FIG. 2 is for illustrative purposes. Other configurations may be implemented. Therefore, network environment 200 may include additional, fewer and/or different components that may be configured in a different arrangement than that depicted in FIG. 2. For example, network environment 200 may also include a Telephony Application Server (TAS) in network 205. Network 205 may further include numerous UEs (e.g., UEs 130-1 through 130-x, where x>2).

Figure 3:
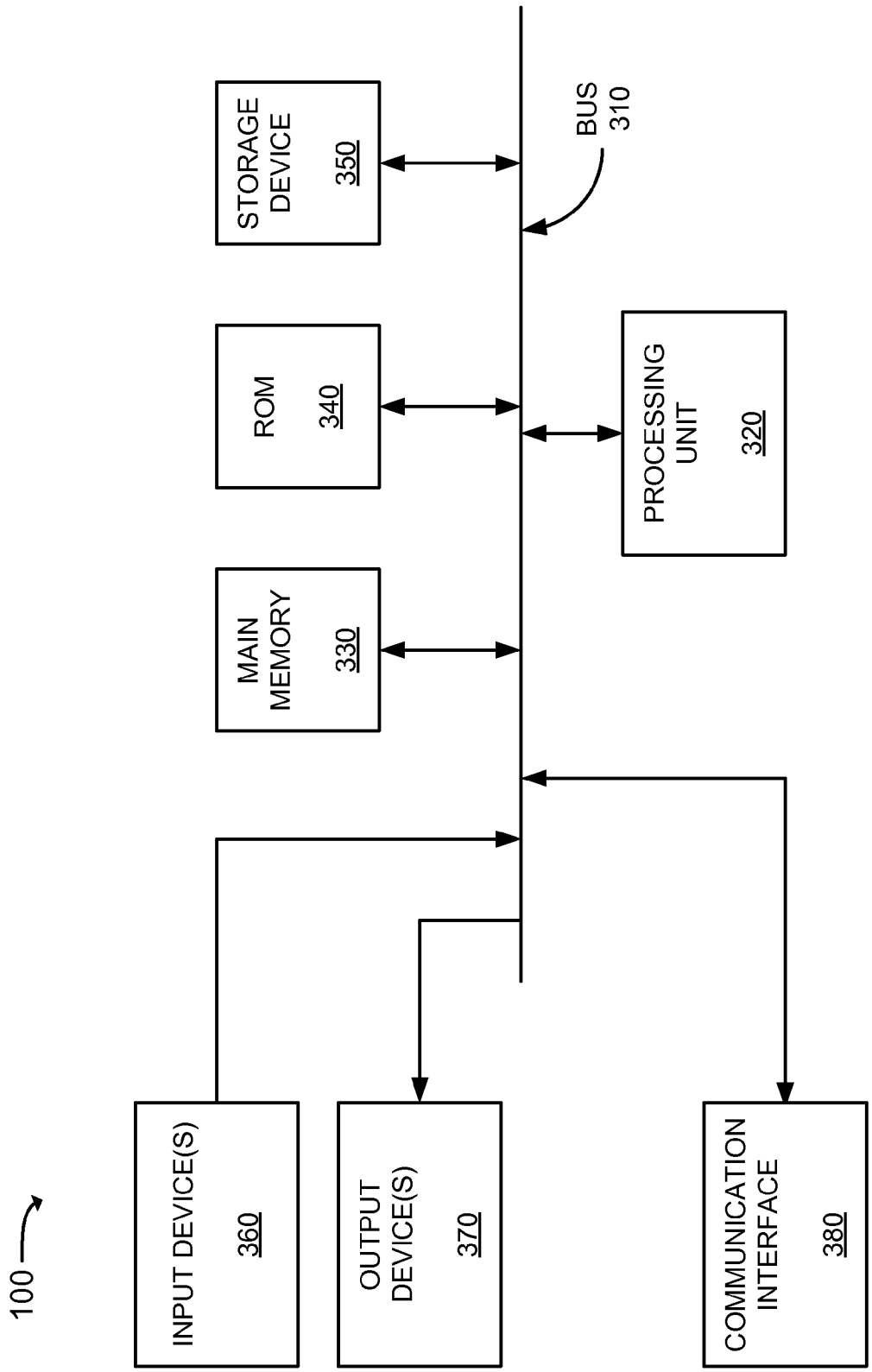
FIG. 3 is a diagram that depicts exemplary components of the provisioning system of FIGS. 1A, 1B and 2.

FIG. 3 is a diagram that depicts exemplary components of provisioning system 100. UE 130, HSS 125, and CSCF 210 may be similarly configured. Provisioning system 100 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of provisioning system 100.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium. Main memory 330, ROM 340 and storage device 350 may each be referred to herein as a "tangible non-transitory computer-readable medium." The process/methods set forth herein can be implemented as instructions that are stored in main memory 330, ROM 340 and/or storage device 350 for execution by processing unit 320.

Input device 360 may include one or more mechanisms that permit an operator to input information to provisioning system 100, such as, for example, a keypad or a keyboard, a display with a touch sensitive panel, voice recognition and/or biometric mechanisms, etc. Output device 370 may include one or more mechanisms that output information to the operator, including a display, a speaker, etc. Input device 360 and output device 370 may, in some implementations, be implemented as a user interface (UI) that displays UI information and which receives user input via the UI. Communication interface(s) 380 may include a transceiver that enables provisioning system 100 to communicate with other devices and/or systems. For example, communication interface(s) 380 may include wired or wireless transceivers for communicating via network 205.

The configuration of components of provisioning system 100 illustrated in FIG. 3 is for illustrative purposes. Other configurations may be implemented. Therefore, provisioning system 100 may include additional, fewer and/or different components than those depicted in FIG. 3.

Figure 4:
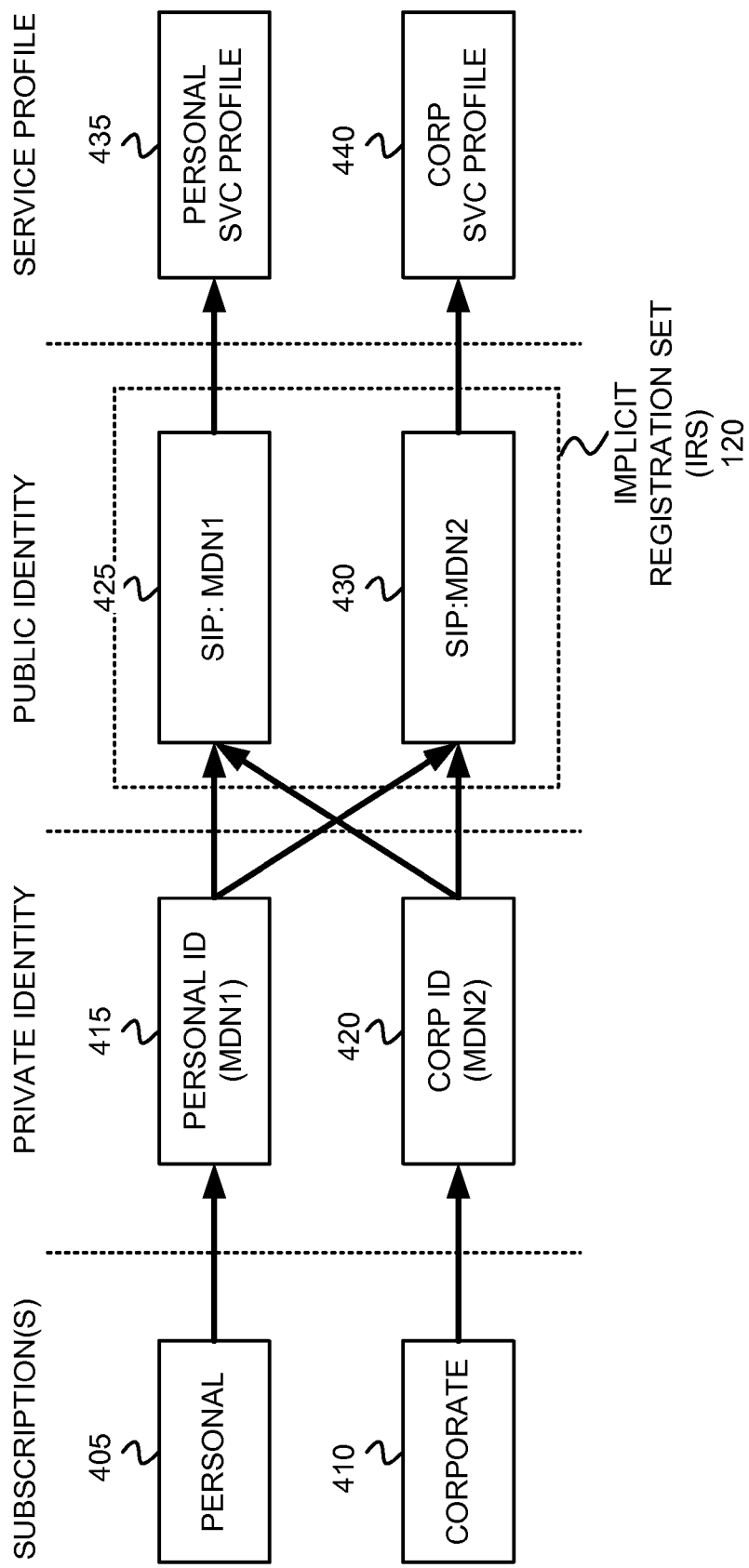
FIG. 4 graphically depicts the linkage of multiple Mobile Directory Numbers within the Implicit Registration Set of FIGS. 1A, 1B and 2.

FIG. 4 graphically depicts the linkage of multiple MDNs within an IRS 120. As shown in the example of FIG. 4, an individual subscriber may have two different subscriptions: a personal subscription 405 and a corporate subscription 410. Personal subscription 405 is associated with a private identity that may include, for example, a personal ID 415 such as an MDN1. Corporate subscription 410 is associated with another private identity that may include, for example, a corporate ID such as an MDN2 420. A public identity may be associated with each of the individual subscriber's personal subscription 405 and corporate subscription 410 in IRS 120. As shown, the subscriber's personal subscription 405 may be associated with the public identity MDN1 425, and the subscriber's corporate subscription 410 may be associated with the public identity MDN2 430. As further shown in FIG. 4, IRS 120 links the individual subscriber's private ID with their public ID, their private ID with their public corporate ID, their private corporate ID with their public corporate ID, and their private corporate ID with their public personal ID. As further shown, public identity MDN1 425 is linked to personal service profile 435, and public identity MDN 2 430 is linked to corporate service profile

440. Though FIG. 4 depicts two different subscriptions being linked to two private identities, in other implementations, a single subscription may be linked to the two private identities.

Figure 5:
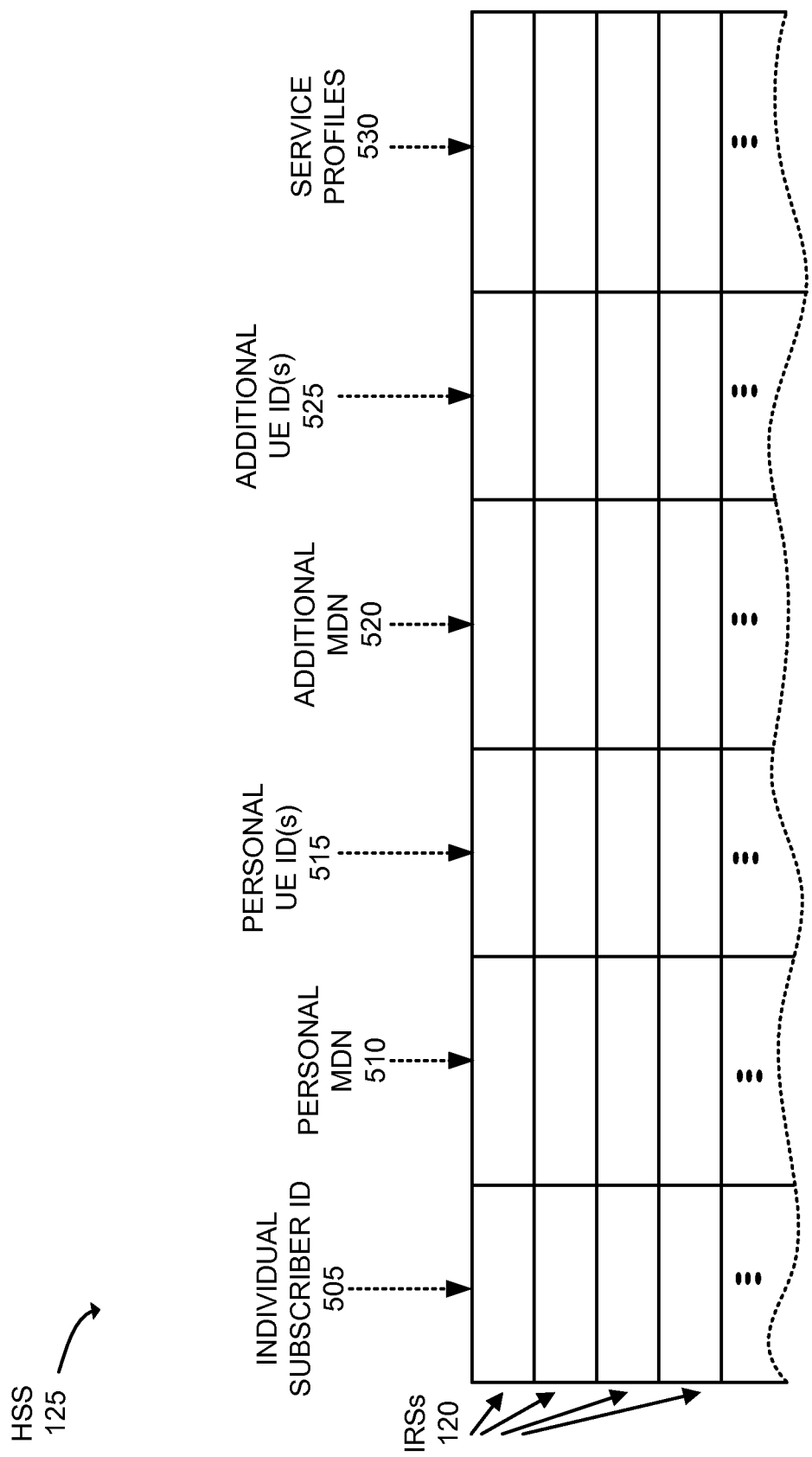
FIG. 5 illustrates exemplary details of the Home Subscriber Server of FIGS. 1A, 1B and 2.

FIG. 5 illustrates exemplary details of HSS 125. As shown, HSS 125 may store multiple different IRSs 120. Each IRS 120 may include an individual subscriber ID field 505, a personal MDN field 510, a personal UE ID(s) field 515, an additional MDN field 520, an additional UE ID(s) field 525, and a service profile field 530.

Individual subscriber ID field 505 stores a unique identifier associated with a given individual subscriber. In one embodiment, field 505 may store a mobile subscriber ID from a SIM card in the subscriber's UE 130 (e.g., an IMSI). Personal MDN field 510 stores a MDN associated with a personal account of the individual subscriber identified in field 505. Personal UE ID(s) field 515 stores a unique identifier associated with each of one or more UEs associated with the subscriber's personal account. Unique IDs associated with multiple UEs may be stored in field 515 to permit the implementation of a "bridged line appearance" where a call to the personal MDN identified in field 510 simultaneously "rings" at the multiple UEs identified in field 515. "Bridged line appearance" occurs when one identity is shared across two UEs.

Additional MDN field 520 stores an additional MDN associated with, for example, a corporate account of the individual subscriber identified in field 505. Additional UE ID(s) field 525 stores a unique identifier associated with each of one or more UEs associated with, for example, the subscriber's corporate account. Unique IDs associated with multiple UEs may be stored in field 525 to permit the implementation of a "bridged line appearance" where a call to the additional MDN identified in field 520 simultaneously "rings" at the multiple UEs identified in field 525. Service profiles field 530 stores a personal service profile that specifies service parameters associated with the personal MDN identified in field 510, and an additional service profile (e.g., corporate service profile) that specifies service parameters associated with the additional MDN identified in field 520.

The number and content of the fields of each IRS 120 of HSS 125 in FIG. 5 is for illustrative purposes. Each IRS 120 of HSS 125 may include additional, fewer and/or different fields than those depicted in FIG. 5. For example, each IRS 120 may include three or more linked MDNs, and their associated UE IDs. In one example, IRS 120 may include personal MDN field 510, personal UE ID(s) field 515, additional MDN field 520, additional UE ID(s) field 525, and an additional corporate MDN field (e.g., corporate MDN2 if additional MDN field 520 identifies a first corporate MDN) and corporate UE ID(s) field (e.g., corporate UE ID(s) 2). HSS 125 is depicted in FIG. 5 as a tabulated data structure for purposes of illustration. Other types of data structures, not shown, may also be used for associating data fields 505-530 within an IRS 120.

Figure 6:
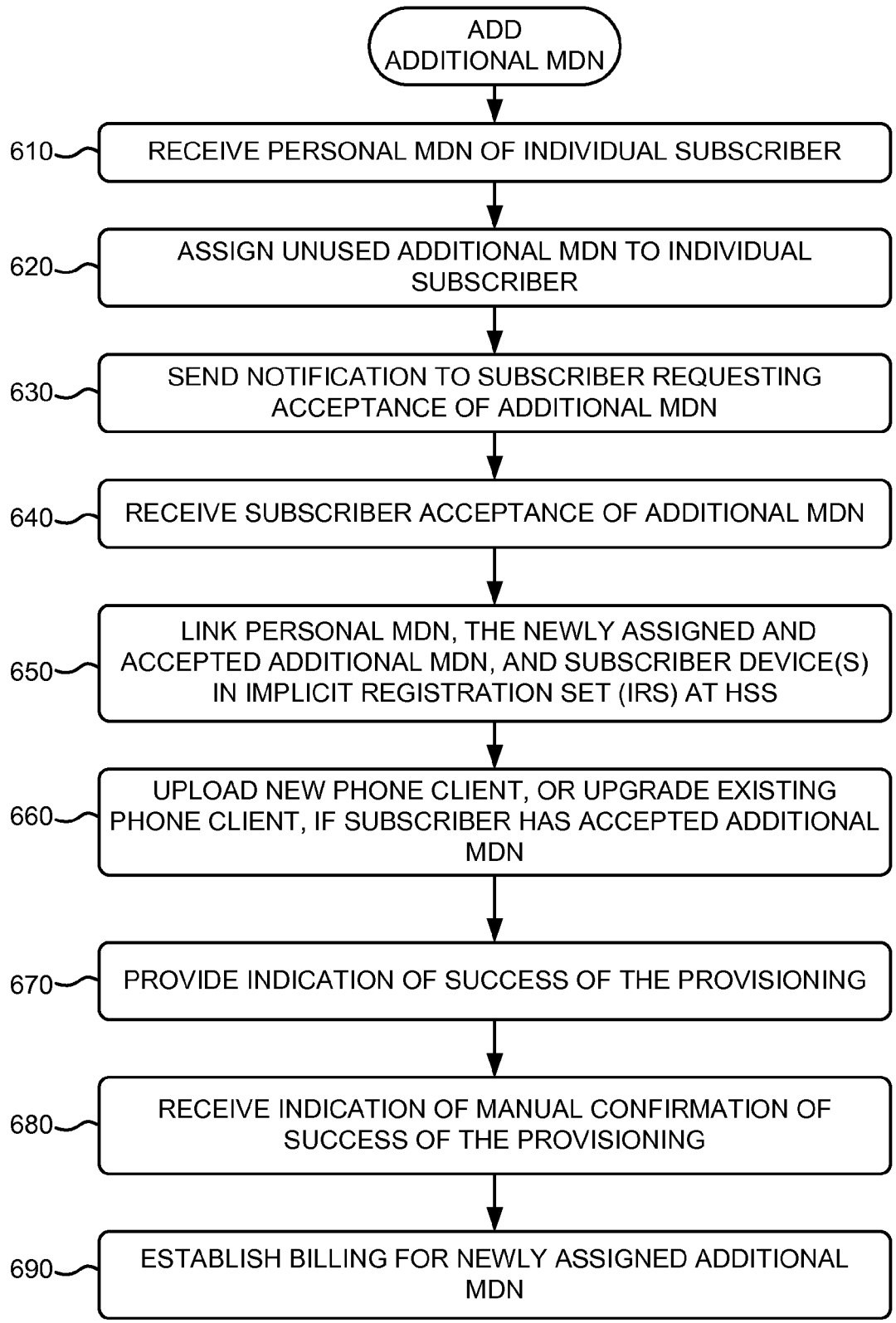
FIG. 6 is a flow diagram of an exemplary process for adding an additional Mobile Directory Number to be associated with an individual subscriber that already has an existing first Mobile Directory Number associated with one or more user equipments.

FIG. 6 is a flow diagram of an exemplary process for adding a new, additional MDN for association with an individual subscriber that already has an existing personal MDN associated with one or more UEs. The exemplary process of FIG. 6 may be implemented by provisioning system 100. The exemplary process of FIG. 6 is described below with reference to the diagrams of FIGS. 7, 8A and 8B. The exemplary process of FIG. 6 may be selectively repeated for each additional MDN to be associated with the individual subscriber.

Figure 7:
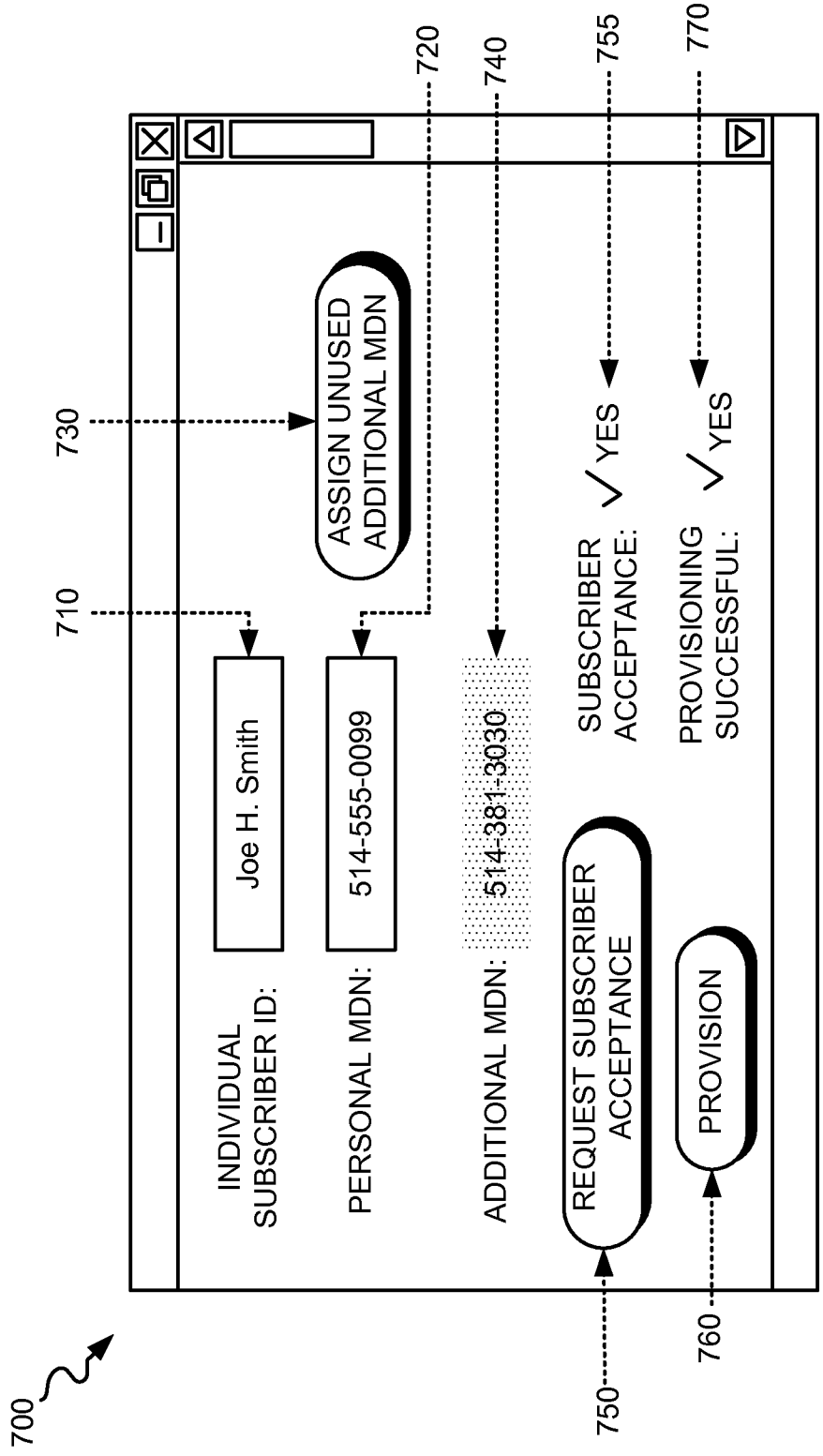
FIG. 7 is a diagram that depicts an exemplary user interface associated with the exemplary process of FIG. 6.
Figure 8A:
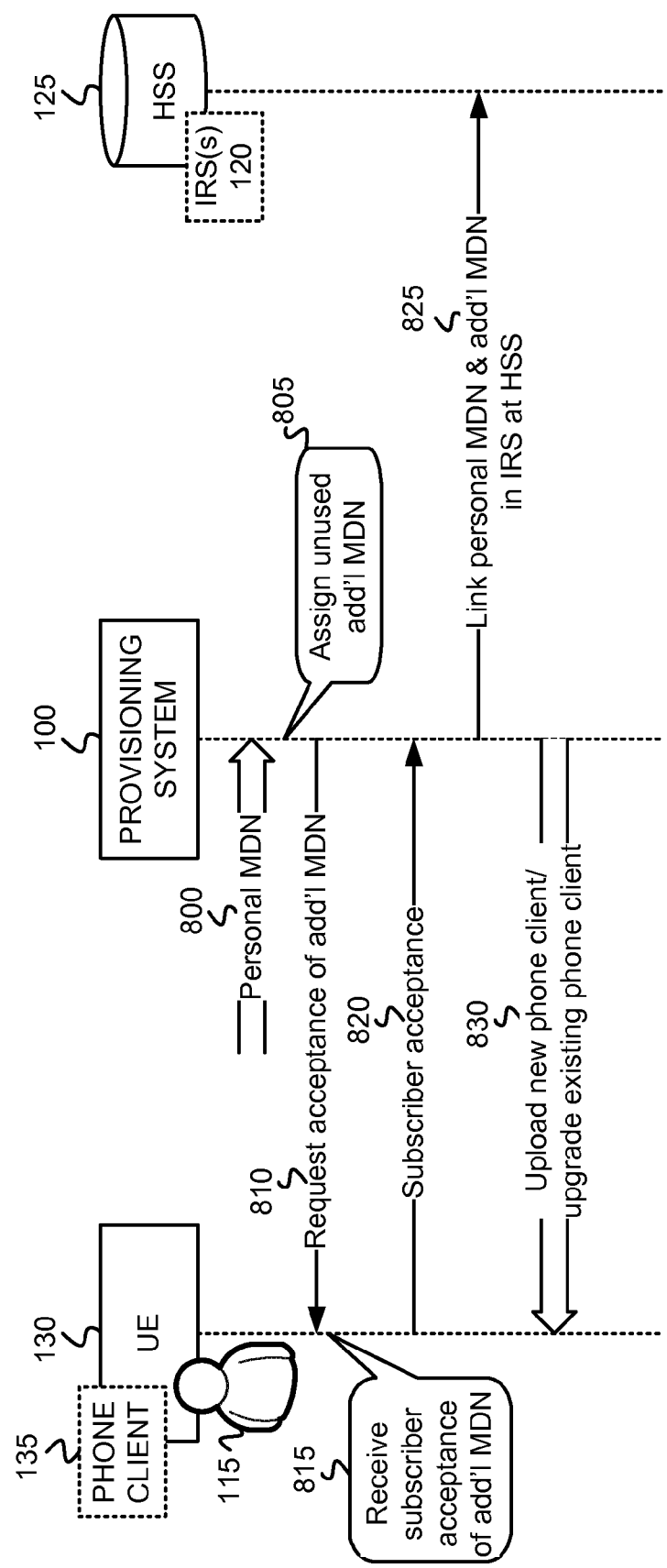
FIG. 8A is a diagram that depicts exemplary messaging associated with the exemplary process of FIG. 6.

The exemplary process may include provisioning system 100 receiving a personal MDN of the individual subscriber that is associated with one or more UEs (block 610). As shown in FIG. 7, management portal 220, implemented at provisioning system 100 or a client device (not shown), may execute a user interface 700 that permits entry of an individual subscriber ID 710 and a personal MDN 720. Management portal 220 (not shown) may be operated by a network administrator, an Information Technology (IT) representative, or other individual, that manually enters individual subscriber ID 710 and personal MDN 720. The messaging diagram of FIG. 8A depicts provisioning system 100 receiving a personal MDN 800.

Provisioning system 100 may assign an unused additional MDN to the individual subscriber (block 620). Alternatively, the additional MDN may be assigned by another device or supplied to provisioning system 100 by the network administrator, Information Technology (IT) representative, or other individual. For example, as shown in FIG. 7, a button 730 on user interface 700 may be selected, and an additional MDN 740 may be assigned from a block, or range, of available, unused MDNs. The messaging diagram of FIG. 8A depicts provisioning system 100 assigning 805 an unused additional MDN.

Provisioning system 100 may send a notification to the subscriber requesting acceptance of the additional MDN (block 630). For example, as shown in FIG. 7, a button 750 on user interface 700 may be selected and the notification requesting acceptance of the additional MDN may be sent from provisioning system 100 to the individual subscriber at UE 130. FIG. 8A depicts provisioning system 100 sending a notification message 810 to a UE 130 associated with the individual subscriber to request the subscriber's acceptance of the additional MDN.

Figure 8B:
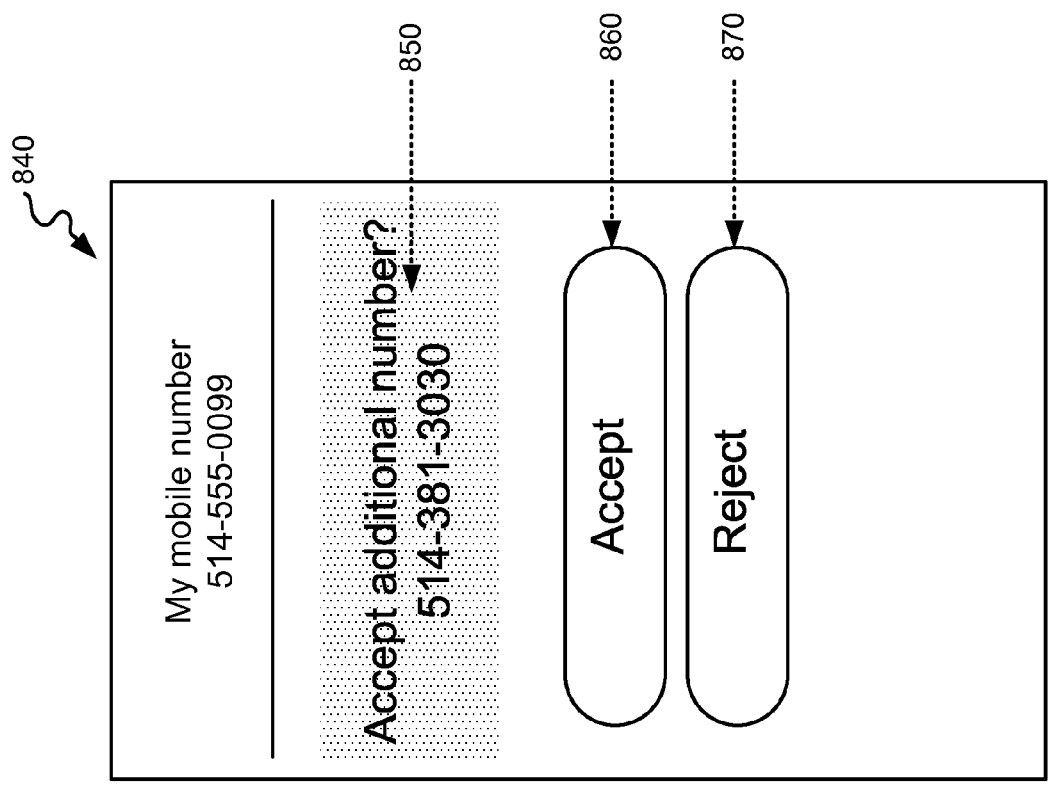
FIG. 8B is a diagram that depicts an exemplary user interface for subscriber acceptance of an additional MDN.

Provisioning system 100 may receive the subscriber's acceptance of the additional MDN (block 640). FIG. 8B depicts a user interface 840 of UE 130 in which subscriber 115 may select whether or not to accept a newly assigned MDN. For example, as shown in FIG. 8B, an acceptance request 850, may displayed in user interface 840 that identifies the newly assigned MDN and requests the subscriber's acceptance. In response to the acceptance request 850, the subscriber (not shown in FIG. 8B) may select an "accept" button 860 accepting the additional MDN, or a "reject" button 870, denying acceptance of the additional MDN. FIG. 8A further depicts subscriber 115's acceptance of the additional MDN being received 815 at UE 130, and UE 130 returning a message 820 to provisioning system 100 that indicates the subscriber's acceptance of the additional MDN. Upon receipt of the subscriber's acceptance of the additional MDN, user interface 700 may display an indication 755 that the subscriber's acceptance has been received.

Subsequent to receiving the subscriber's acceptance of the additional MDN, provisioning system 100 may link the received personal MDN and the newly assigned and accepted additional MDN in IRS 120 at HSS 125 (block 650). Provisioning system 100 may additionally link the personal MDN and the newly assigned additional MDN with one or more subscriber devices associated with the individual subscriber in IRS 120 at HSS 125. Referring to FIG. 5, provisioning system 100 may store the individual subscriber's ID in field 505; the personal MDN in personal MDN field 510; IDs, associated with one or more UEs to be associated with the personal MDN stored in field 510, in personal UE ID(s) field 515; the additional MDN in additional MDN field 520; IDs, associated with one or more UEs to be associated with the additional MDN stored in field 520, in additional UE ID(s) field 525; and the personal service profile and the additional service profile for the individual subscriber in service profiles field 530. As shown in user interface 700 of FIG. 7, a provisioning button 760 may be selected to initiate the linking of the personal MDN and the assigned and accepted additional MDN by provisioning system 100. Provisioning button 760 may, for example, only appear in user interface 700 if subscriber acceptance of the additional MDN is received by provisioning system 100. The messaging diagram of FIG. 8A depicts provisioning system 100 linking 825 the personal MDN and the additional MDN in IRS 120 at HSS 125.

Provisioning system 100 may upload a new phone client, or update the existing phone client, of UE 130 if the subscriber has accepted the additional MDN (block 660). FIG. 8A depicts provisioning system 100 uploading 830 a new phone client, or upgrading existing phone client 135, based on receipt of subscriber acceptance 820. Provisioning system 100 may provide an indication of successful provisioning (block 670). Upon successful completion of the linking of the personal MDN, the additional MDN and the one or more subscriber devices, provisioning system 100 may send a message indicating that the provisioning was successful. The message may be sent to, for example, a client device implementing user interface 700 and/or to phone client 135 at UE 130 of subscriber 115. FIG. 7 depicts a provisioning successful indicator 770 displayed in user interface 700.

Provisioning system 100 may receive an indication of manual confirmation of the successful provisioning (block 680). The network administrator, Information Technology (IT) representative, or other individual may manually confirm the success of the provisioning by making an audio or video call to the assigned corporate MDN from another MDN, and by making an audio or video call to the personal MDN from another MDN. The network administrator, Information Technology (IT) representative, or other individual may further request the individual subscriber 115 to make a call from UE 130 via the personal MDN and another call from UE 130 via the additional MDN.

Provisioning system 100 may establish billing for the newly assigned additional MDN (block 690). A billing system (not shown) may associate the newly assigned additional MDN with the individual subscriber for purposes of maintaining billing records. Activity using the personal MDN may be billed to the individual subscriber, whereas activity using the additional MDN, when the additional MDN includes a corporate MDN, may be billed to a corporation or business entity responsible for assigning the additional MDN to the individual subscriber.

Figure 9A:
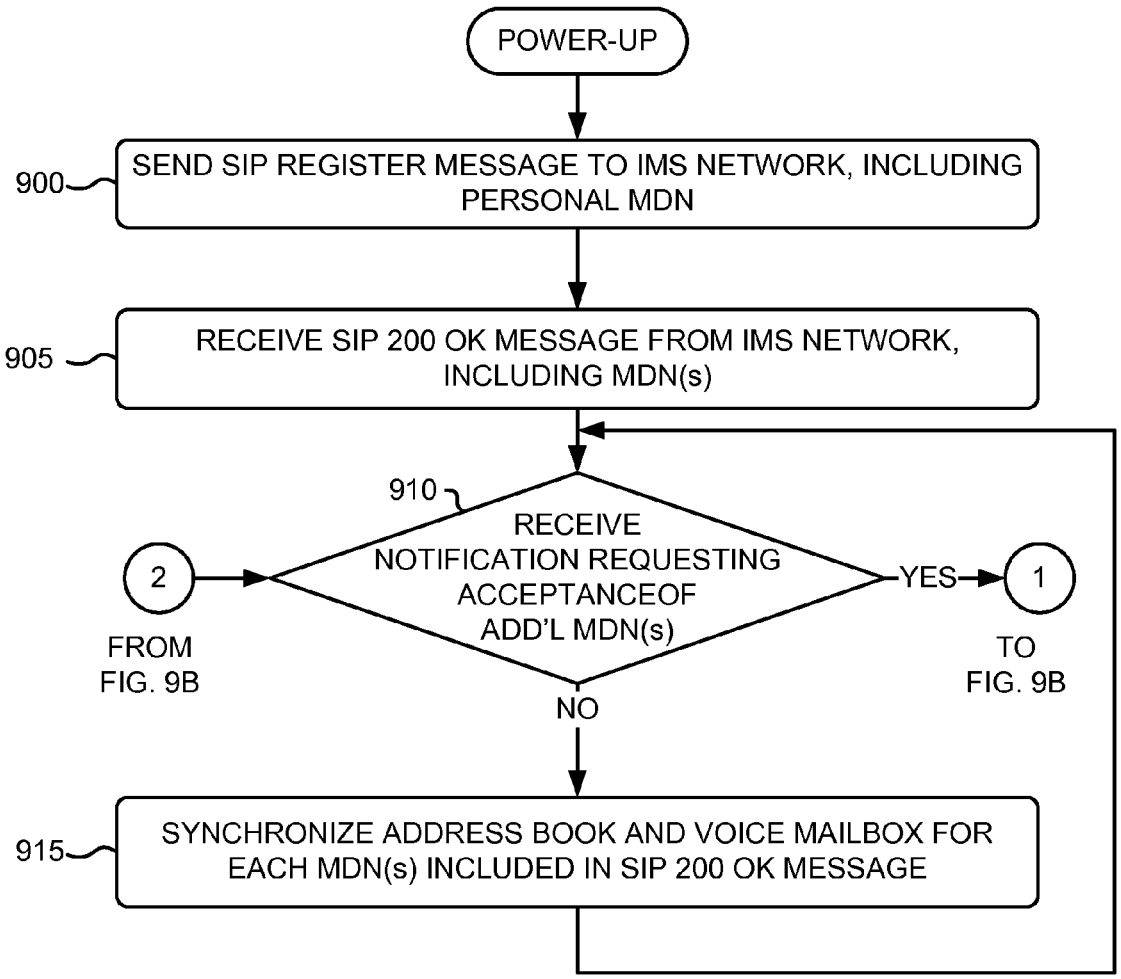
FIGS. 9A and 9B are flow diagrams of an exemplary process for synchronizing multiple implicitly registered MDNs at a phone client based on subscriber acceptance of the assignment of an additional MDN at the phone client.
Figure 9B:
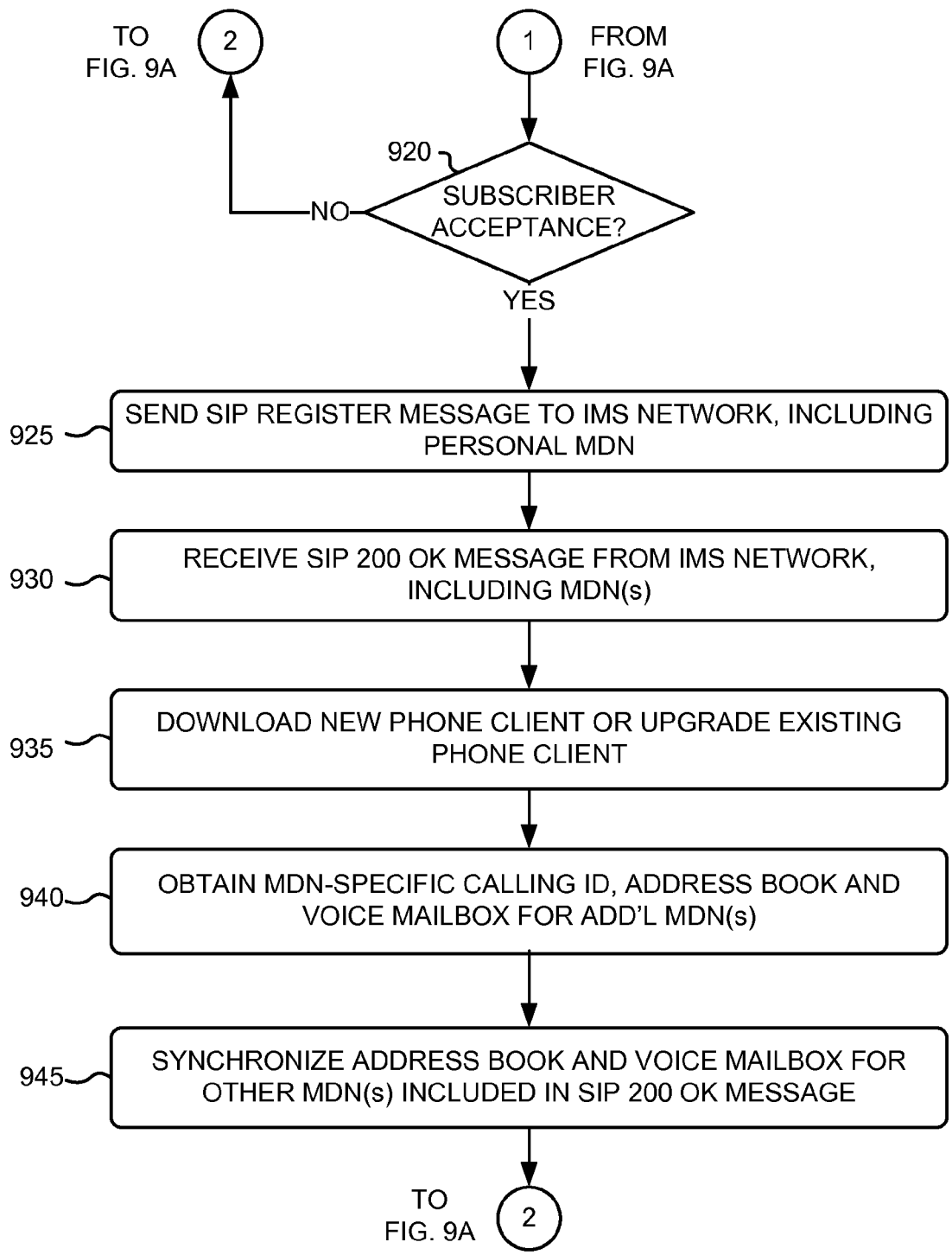

FIGS. 9A and 9B are flow diagrams of an exemplary process for synchronizing multiple implicitly registered MDNs at phone client 135. The exemplary process of FIGS. 9A and 9B may be implemented by phone client 135. The exemplary process of FIGS. 9A and 9B is described below with reference to the diagrams of FIGS. 10, 11A and 11B. The exemplary process of FIGS. 9A and 9B may be selectively repeated each time that UE 130 powers up from a powered down status.

The exemplary process may include phone client 135 sending a SIP REGISTER message to the IMS network that includes a personal MDN (block 900). For example, at power up of UE 130, phone client 135 sends a SIP REGISTER message to CSCF 210, where the SIP REGISTER message includes the personal MDN. Upon receipt of the SIP REGISTER message, CSCF 210 may send a message to retrieve the multiple implicitly registered MDNs from IRS 120 based on the personal MDN received in the message. Upon receipt of the message, HSS 125 may retrieve the multiple implicitly registered MDNs from IRS 120 based on the received personal MDN.

HSS 125 may further retrieve service profiles and device(s) routing information based on the retrieved implicitly registered MDNs. The service profiles may include the personal service profile and the additional service profile in the case where the multiple implicitly registered MDNs includes a personal subscription and an additional (e.g., corporate) subscription. The device(s) routing information may include the information necessary for routing a call to one or more devices associated with a particular MDN. HSS 125 may, via a message, return the retrieved implicitly registered MDNs, service profiles, and device(s) routing information to CSCF 210 which, in turn, may store all of this information for locally handling future calls to the implicitly registered MDNs.

Phone client 135 may receive a SIP 200 OK message from the IMS network, including the registered MDN(s) (block 910). CSCF 210 sends a SIP 200 OK message to UE 130, where the SIP 200 OK message includes the registered MDN(s) retrieved from IRS 120 of HSS 125. In one example, the registered MDN(s) retrieved from IRS 120 may include the personal MDN and another MDN (e.g., the additional MDN from FIG. 1A) that has been associated with the individual subscriber. In other embodiments, messaging protocols other than SIP may be used to obtain the registered MDN(s) at client 135. In such embodiments, messaging other than the SIP REGISTER message of block 900, and the SIP 200 OK message of block 910, may be used to obtain the registered MDN(s) at client 135 from IRS 120.

Phone client 135 of UE 130 may determine whether a notification requesting acceptance of an additional MDN(s) has been received (block 910). Provisioning system 100 may send the notification requesting acceptance of the additional MDN(s) to UE 130. An additional MDN may be newly assigned to the subscriber, as subscribed above with respect to FIG. 6. The notification requesting acceptance of the additional MDN may, for example, be sent to the subscriber at UE 130 from provisioning system 100 via Short Messaging Service (SMS), electronic mail (e-mail), or instant messaging (IM). Upon receipt of the notification, phone client 135 at UE 130 may display, for example, a "pop-up" message that requests subscriber acceptance of the additional MDN. In other embodiments, the notification may be sent to UE 130 using an automated phone call (e.g., via Interactive Voice Response (IVR)), and the subscriber may, for example, press "1" to accept, or "2" to reject, the additional MDN.

If a notification requesting acceptance of an additional MDN(s) is not received (NO—block 910), then phone client 135 may synchronize the address book and voice mailbox for each of the multiple implicitly registered MDNs included in the SIP 200 OK message (block 915). Synchronizing the address book and voice mailbox may include determining if there are any new voice mails for each of the multiple implicitly registered MDNs, and if there have been any changes to the address book for each of the multiple implicitly registered MDNs.

Figure 10:
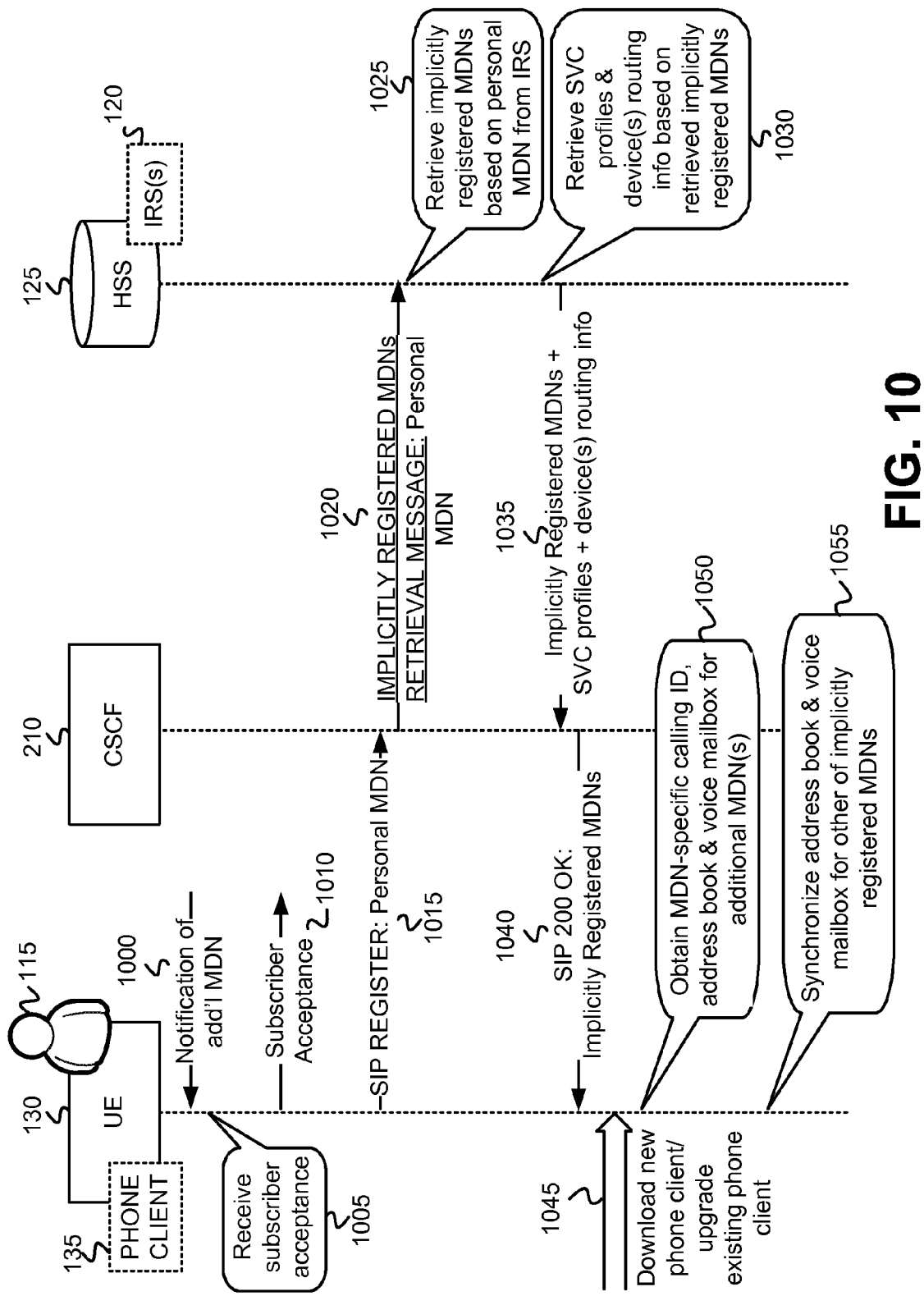
FIG. 10 is a diagram that depicts exemplary messaging associated with the exemplary process of FIGS. 9A and 9B.

If a notification requesting acceptance of an additional MDN(s) has been received (YES—block 910), then phone client 135 may determine if an acceptance of the additional MDN has been received from the subscriber (block 920). FIG. 10 depicts a notification 1000 of the additional MDN being received at UE 130 and, based on receipt of notification 1000, phone client 135 of UE 130 receiving 1005 an acceptance of the additional MDN from subscriber 115.

Referring again to FIG. 8B, user interface 840 at UE 130 enables subscriber 115 to select whether or not to accept a newly assigned MDN. For example, as shown in FIG. 8B, an acceptance request 850, may displayed in user interface 840 that identifies the newly assigned MDN and requests the subscriber's acceptance. In response to the acceptance request 850, the subscriber (not shown in FIG. 8B) may select an "accept" button 860 accepting the additional MDN, or a "reject" button 870, denying acceptance of the additional MDN. In other embodiments, phone client 135 may, without subscriber intervention, automatically accept the additional MDN.

If the subscriber does not accept the additional MDN (NO—block 920, FIG. 9B), then the exemplary process may return to block 910. If the subscriber accepts the additional MDN (NO—block 920), then UE 130 may send a SIP REGISTER message to the IMS network that includes the subscriber's personal MDN (block 925). As shown in FIG. 10, phone client 135 sends SIP REGISTER message 1015 to CSCF 210, where message 1015 includes the personal MDN of the subscriber. As further shown in FIG. 10, upon receipt of SIP REGISTER message 1015, CSCF 210 may send a message 1020 to retrieve the multiple implicitly registered MDNs from IRS 120 based on the personal MDN received in message 1015. As also shown in FIG. 10, HSS 125 may retrieve 1025 the multiple implicitly registered MDNs from IRS 120 based on the received personal MDN. HSS 125 may further retrieve 1030 service profiles and device(s) routing information based on the retrieved implicitly registered MDNs. The service profiles may include the personal service profile and the additional (e.g., corporate) service profile in the case where the multiple implicitly registered MDNs includes a personal subscription and an additional subscription. The device(s) routing information may include the information necessary for routing a call to one or more devices associated with a particular MDN. HSS 125 may, via a message 1035, return the retrieved implicitly registered MDNs, service profiles, and device(s) routing information to CSCF 210 which, in turn, may store all of this information locally for handling future calls to the implicitly registered MDNs. In one example, the multiple implicitly registered MDNs retrieved from IRS 120 may include the personal MDN and the additional MDN associated with the individual subscriber. In other embodiments, messaging protocols other than SIP may be used to obtain the multiple implicitly registered MDNs at client 135. In such embodiments, messaging other than the SIP REGISTER message of block 925, and the SIP 200 OK message of block 930 (below), may be used to obtain the multiple implicitly registered MDNs at client 135 from IRS 120.

Phone client 135 may receive a SIP 200 OK message from the IMS network, including multiple implicitly registered MDNs (block 930). FIG. 10 depicts CSCF 210 sending a SIP 200 OK message 1040 to UE 130, where message 1040 includes the implicitly registered MDNs retrieved from IRS 120 of HSS 125.

UE 130 may download a new phone client, or upgrade an existing phone client (block 935). The new/upgraded phone client 135 ma include functionality that enables calls to be sent/received at UE 130 via multiple MDNs. FIG. 10 depicts UE 130 downloading 1045 a new phone client to replace phone client 135, or upgrading existing phone client 135. Phone client 135 may obtain the MDN-specific calling ID, address book, and voice mailbox for the additional MDN included among the multiple implicitly registered MDNs from the SIP 200 OK message (block 940). In the example where the multiple implicitly registered MDNs include the personal MDN and any additional MDNs, then phone client 135 at UE 130 may obtain a first calling ID, a first address book and a first voice mailbox for the personal MDN, and may obtain a second calling ID, a second address book and a second voice mailbox for the additional MDN(s)*e.g., corporate MDN). FIG. 10 shows phone client 135 of UE 130 obtaining 1050 the MDN-specific calling ID, address book, and voice mailbox for the additional MDN(s). The MDN-specific calling ID, address book and/or voice mailbox may be obtained from CSCF 210, HSS 125, or from another network source. Phone client 135 may then synchronize the address book and voice mailbox for other of the multiple implicitly registered MDNs included in the SIP 200 OK message (block 945). Synchronizing the address book and voice mailbox may include determining if there are any new voice mails for each of the other of the multiple implicitly registered MDNs, and if there have been any changes to the address book for each of the other of the multiple implicitly registered MDNs. FIG. 10 depicts phone client 135 of UE 130 synchronizing 1055 the address book and the voice mailbox for the other of the implicitly registered MDNs (i.e., the MDNs other than the additional MDN(s)).

Figure 11B:
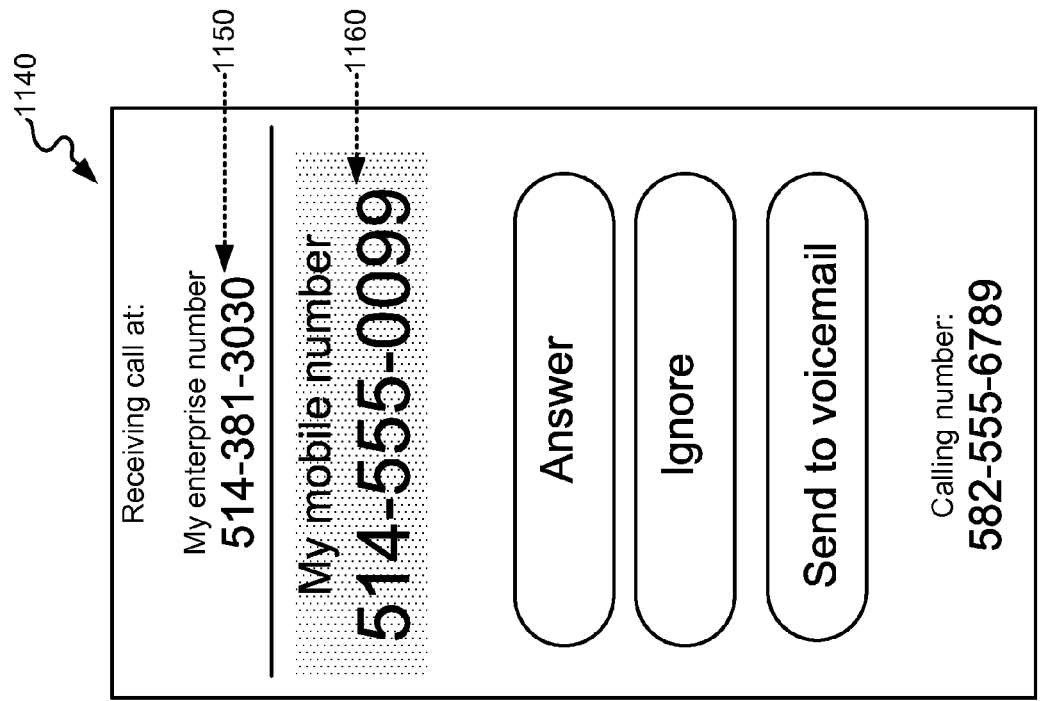
FIGS. 11A and 11B are diagrams that illustrate the implementation of a personal Mobile Directory Number and a corporate Mobile Directory Number at a user equipment.
Figure 11A:
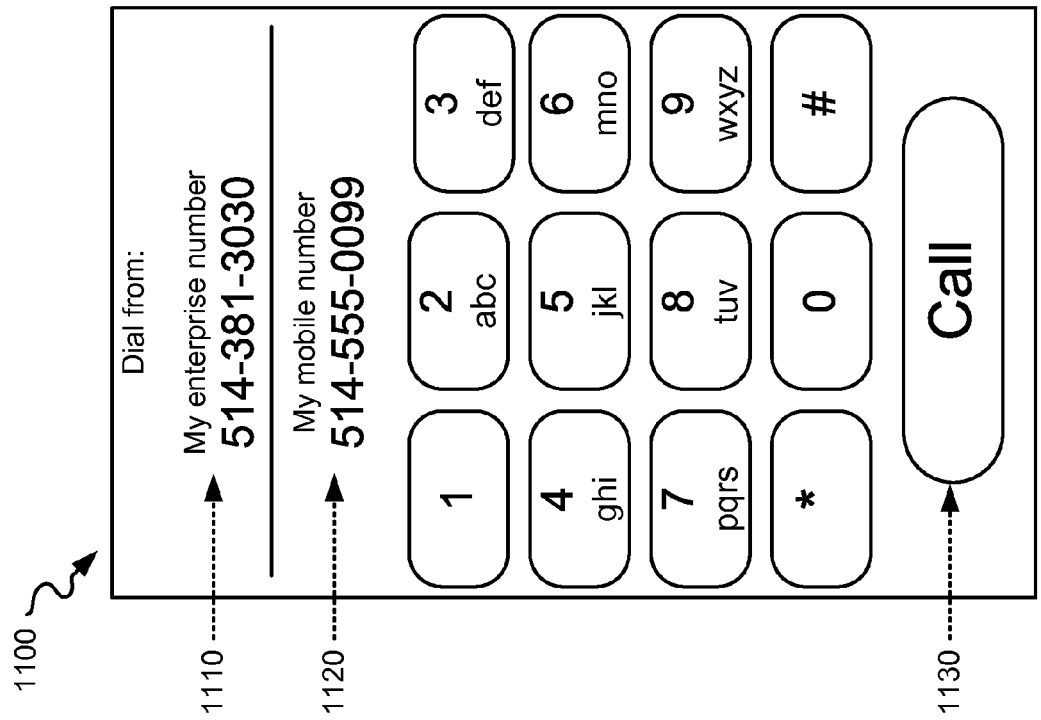

FIG. 11A depicts a display 1100 of UE 130 subsequent to blocks 920-945 of the exemplary process of FIGS. 9A and 9B when the individual subscriber wishes to initiate a call via one of the MDNs at UE 130. As shown, the individual subscriber may select either a corporate MDN 1110 (the additional MDN) or a personal MDN 1120 from which to place a call 1130 from UE 130. FIG. 11B depicts a display 1140 of UE 130 subsequent to provisioning based on the received multiple implicitly registered MDNs, when a call is received at UE 130 via one of the multiple MDNs. As shown, an additional MDN 1150 (e.g., a corporate MDN) and a personal MDN 1160 are displayed, with personal MDN 1160 being highlighted to indicate that an incoming call is being received at UE 130 for the personal MDN. The individual subscriber may select the personal MDN 1160, as the incoming call, and then select whether to "answer," "ignore," or "send to voicemail" the incoming call of the selected MDN.

Figure 12:
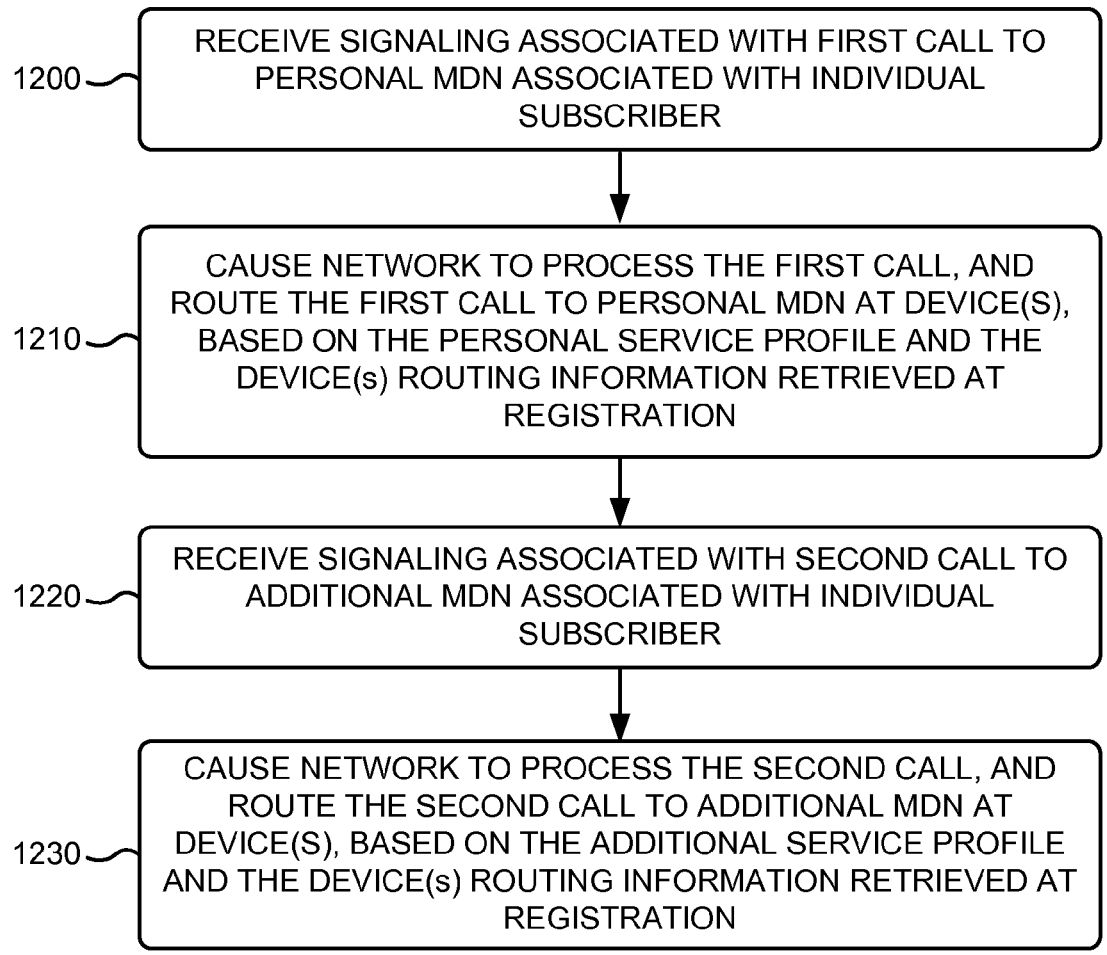
FIG. 12 is a flow diagram of an exemplary process for handling calls to a subscriber at a UE that is implicitly registered with multiple MDNs.

FIG. 12 is a flow diagram of an exemplary process for handling calls to a subscriber at a UE that is implicitly registered with multiple MDNs. The exemplary process of FIG. 12 may be implemented by CSCF 210 in an IMS network. The exemplary process of FIG. 12 is described below with reference to the messaging diagram of FIG. 13.

Figure 13:
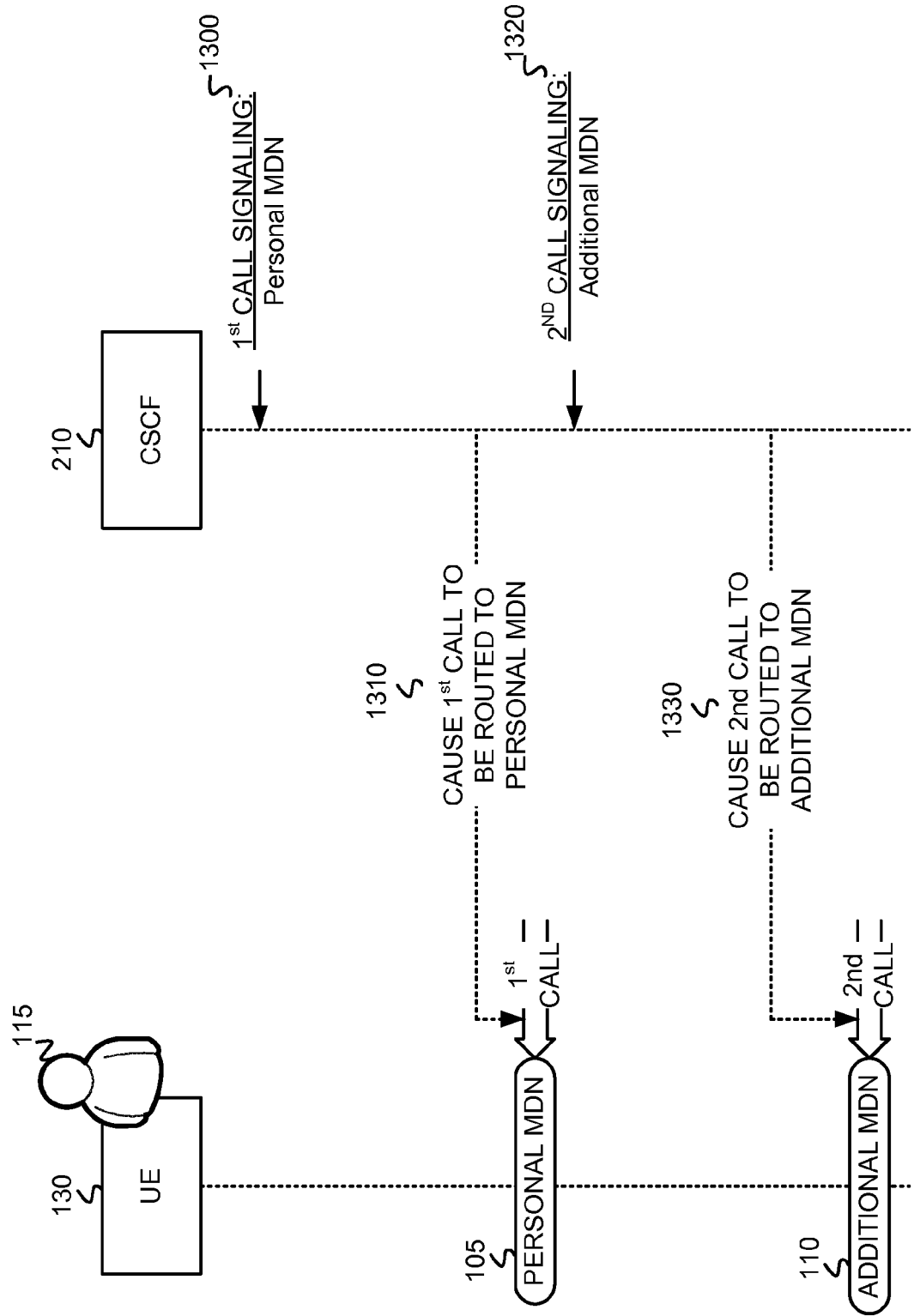
FIG. 13 is a diagram that depicts exemplary messaging associated with the exemplary process of FIG. 12.

The exemplary process may include CSCF 210 receiving signaling associated with a first call to a personal MDN associated with an individual subscriber (block 1200). FIG. 13 depicts signaling 1300 associated with a first call to the personal MDN associated with individual subscriber 115. CSCF 210 may cause network 205 to process the first call, and route the first call to the personal MDN at device(s), based on the personal service profile and the device(s) routing information retrieved at registration (block 1210). CSCF 210 may have previously received the personal service profile and the device(s) routing information from HSS 125 as shown at 1025 and 1030 in FIG. 10. Causing network 205 to route the first call may involve using existing signaling to route the first call via elements of the transport network to UE 130. FIG. 13 depicts CSCF 210 causing 1310 the first call to be routed to personal MDN 105 at UE 130 of individual subscriber 115.

CSCF 210 may receive signaling associated with a second call to an additional MDN associated with the individual subscriber (block 1220). FIG. 13 depicts signaling 1320 associated with a second call to the additional MDN associated with individual subscriber 115. CSCF 210 may cause network 205 to process the second call, and route the second call to the additional MDN at device(s), based on the additional service profile and the device(s) routing information retrieved at registration (block 1230). CSCF 210 may have previously received the additional service profile and the device(s) routing information from HSS 125 as shown at 1025 and 1030 in FIG. 10. Causing network 205 to route the second call may involve using existing signaling to route the second call via elements of the transport network to UE 130. FIG. 13 depicts CSCF 210 causing 1330 the second call to be routed to additional MDN 110 at UE 130 of individual subscriber 115.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 9A, 9B, and 12, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at a network device, a first Mobile Directory Number (MDN) associated with an individual subscriber, wherein the individual subscriber is further associated with one or more subscriber devices;
   receiving, at the network device, an additional MDN newly assigned to the individual subscriber;
   sending, from the network device to at least one of the one or more subscriber devices, a notification requesting the individual subscriber's acceptance of the additional MDN;
   receiving, at the network device from one of the one or more subscriber devices, an acceptance of the additional MDN by the individual subscriber; and
   linking, by the network device based on receiving the acceptance, the additional MDN, the first MDN, and the one or more subscriber devices within an Implicit Registration Set (IRS) at a Home Subscriber Server (HSS) in an Internet Protocol Multimedia Subsystem (IMS) for routing calls to the individual subscriber's first MDN or additional MDN at the one or more subscriber devices.

2. The method of claim 1, wherein the individual subscriber is associated with at least two subscriber devices, and the additional MDN is associated with the at least two subscriber devices.

3. The method of claim 1, further comprising:
   receiving the first MDN and the additional MDN from another device that is different than the one or more subscriber devices and the network device.

4. The method of claim 1, further comprising:
   receiving an indication that confirmation of the linking of the additional MDN, the first MDN, and the one or more subscriber devices has been successful.

5. The method of claim 1, further comprising:
   retrieving data from the IRS at the HSS;
   receiving signaling associated with a first call to the first MDN;
   causing the first call to be routed to the one or more subscriber devices linked to the first MDN based on the retrieved data;
   receiving signaling associated with a second call to the additional MDN; and
   causing the second call to be routed to the one or more subscriber devices linked to the additional MDN based on the retrieved data.

6. A network device, comprising:
   a communication interface; and
   a processing unit configured to:
   receive, via the communication interface, a first Mobile Directory Number (MDN) associated with an individual subscriber, wherein the individual subscriber is further associated with one or more subscriber devices,
   receive, via the communication interface, an additional MDN newly assigned to the individual subscriber;
   cause a notification, requesting the individual subscriber's acceptance of the additional MDN, to be sent via the communication interface to at least one of the one or more subscriber devices;
   receive, via the communication interface from one of the one or more subscriber devices, an acceptance of the additional MDN by the individual subscriber; and
   link, via the communication interface, the additional MDN, the first MDN, and the one or more subscriber devices, within an Implicit Registration Set (IRS) at a Home Subscriber Server (HSS) in an Internet Protocol Multimedia Subsystem (IMS) network for routing calls to the individual subscriber's first MDN or additional MDN at the one or more subscriber devices.

7. The network device of claim 6, wherein the first MDN comprises a MDN associated with a personal account of the individual subscriber and wherein the additional MDN comprises a MDN associated with a corporate account of the individual subscriber.

8. The network device of claim 6, wherein the individual subscriber is associated with at least two subscriber devices, and the additional MDN is associated with the at least two subscriber devices.

9. The network device of claim 6, wherein the processing unit is further configured to:
   receive the personal MDN and the additional MDN via a user interface implemented at another device.

10. A method, comprising:
- receiving, at a device from a first remote network device via a network, a notification that requests an individual subscriber's acceptance of a second MDN newly assigned to the individual subscriber, in addition to a first MDN assigned to the individual subscriber;
- receiving, by the individual subscriber at the device, an acceptance of the additional MDN;
- sending, based on the acceptance of the additional MDN, a first message from the device to a second remote network device;
- receiving, at the device from the second remote network device, a second message that includes an identification of multiple Mobile Directory Numbers (MDNs) linked to the individual subscriber associated with the device, where in the multiple MDNs include the first MDN and the second MDN; and
- obtaining, at the device, a MDN-specific calling 113, an address book, and a voice mailbox for each of the multiple MDNs identified in the second message.

11. The method of claim 10, wherein the first message comprises a Session Initiation Protocol (SIP) message and the second message comprises a SIP reply message.

12. The method of claim 10, wherein the device comprises a land-line or mobile telephone, a personal digital assistant (PDA), or a tablet, desktop, palmtop, or laptop computer.

13. The method of claim 10, further comprising:
- receiving, at the device, an indication of a first outgoing call via the first MDN from the individual subscriber;
- initiating the first outgoing call from the device;
- receiving, at the device, an indication of an outgoing call via the second MDN from the individual subscriber; and
- initiating the second outgoing call from the device.

14. The method of claim 10, wherein the second remote network device comprises a Call Session Control Function (CSCF) in an Internet Protocol Multimedia Subsystem (IMS) network.

15. A device, comprising:
- a user interface;
- a communication interface coupled to an external network; and
- a processing unit configured to execute a phone client to:
  - receive, via the communication interface from a first remote network device, a notification that requests an individual subscriber's acceptance of a second Mobile Directory Number (MDN) newly assigned to the individual subscriber, in addition to a first MDN assigned to the individual subscriber,
  - receive, from the individual subscriber via the user interface, an acceptance of the second MDN,
  - send, based on the receipt of the subscriber acceptance of the second MDN, a first message from the phone client to a second remote network device via the communication interface,
  - receive, at the phone client from the second remote network device via the communication interface, a second message that includes an identification of multiple MDNs linked to the individual subscriber associated with the device, wherein the multiple MDNs include the first MDN and the second MDN, and
  - obtain a MDN-specific calling ID, an address book, and a voice mailbox for each of the multiple MDNs identified in the second message.

16. The device of claim 15, wherein the device comprises a land-line or mobile telephone, a personal digital assistant (PDA), or a tablet, desktop, palmtop, or laptop computer.

17. The device of claim 15, wherein the communication interface is further configured to receive an indication of as first outgoing call, via the first MDN, from the individual subscriber, and wherein the processing unit is further configured to initiate the first outgoing call from the device.

18. The device of claim 17, wherein the communication interface is further configured to receive an indication of an outgoing call, via the second MDN, from the individual subscriber; and wherein the processing unit is further configured to initiate the second outgoing call from the device.

19. The device of claim 15, wherein, when obtaining, the processing unit is further configured to execute the phone client to:
- obtain a first MDN-specific calling ID, a first address book, and a first voice mailbox for the first MDN, and
- obtain a second MDN-specific calling ID, a second address book, and a second voice mailbox for the second MDN.

20. The device of claim 15, wherein the first MDN comprises a MDN associated with a personal account of the individual subscriber, and wherein the second MDN comprises a MDN associated with a corporate account of the individual subscriber.

21. The device of claim 15, wherein the first message comprises a Session Initiation Protocol (SIP) message and the second message comprises a SIP reply message.

22. The device of claim 15, wherein the second remote network device comprises a Call Session Control Function (CSCF) in an Internet Protocol Multimedia Subsystem (IMS) network.

* * * * *